US010126900B2

(12) United States Patent
    Bohannon

(10) Patent No.: US 10,126,900 B2
(45) Date of Patent: Nov. 13, 2018

(54) REDUCED CAPACITIVE BASELINE SHIFT USING NULL TIME PERIODS

(71) Applicant: SYNAPTICS INCORPORATED, San Jose, CA (US)

(72) Inventor: Eric Scott Bohannon, Henrietta, NY (US)

(73) Assignee: SYNAPTICS INCORPORATED, San Jose, CA (US)

( * ) Notice: Subject to any disclaimer, the term of this patent is extended or adjusted under 35 U.S.C. 154(b) by 37 days.

(21) Appl. No.: 15/478,965

(22) Filed: Apr. 4, 2017

(65) Prior Publication Data

US 2018/0284917 A1    Oct. 4, 2018

(51) Int. Cl.
    G06F 3/045      (2006.01)
    G06F 3/044      (2006.01)
    G09G 5/00       (2006.01)
    G06F 3/0354     (2013.01)

(52) U.S. Cl.
    CPC .......... G06F 3/044 (2013.01); G06F 3/03545 (2013.01); G09G 5/003 (2013.01)

(58) Field of Classification Search
    CPC ...... G06F 3/044; G06F 3/03545; G09G 5/003
    See application file for complete search history.

(56) References Cited

U.S. PATENT DOCUMENTS

| 2007/0074913 A1 | 4/2007  | Geaghan et al. |
| 2009/0303198 A1 | 12/2009 | Yilmaz et al.  |
| 2010/0289754 A1 | 11/2010 | Sleeman et al. |
| 2010/0292945 A1 | 11/2010 | Reynolds et al.|

FOREIGN PATENT DOCUMENTS

WO    WO-2012048263 A1    4/2012

OTHER PUBLICATIONS

PCT Application No. PCT/2018/019550 International Search Report and Written Opinion dated May 24, 2018, consists of 11 pages.

*Primary Examiner* — Rodney Amadiz
(74) *Attorney, Agent, or Firm* — Patterson + Sheridan, LLP

(57) ABSTRACT

A method and related input device and processing system and are disclosed, the method comprising acquiring first capacitive measurements of first resulting signals responsive to driving a first sensing signal, wherein acquiring first capacitive measurements comprises receiving a predefined number of current pulses within a first burst period. The method further comprises acquiring second capacitive measurements of second resulting signals responsive to driving a second sensing signal having a greater sensing frequency. Acquiring the second capacitive measurements comprises inserting, based at least on the sensing frequency of the second sensing signal, one or more null time periods within the second burst period such that the same number of current pulses is received during the second burst period.

20 Claims, 7 Drawing Sheets

REDUCED CAPACITIVE BASELINE SHIFT USING NULL TIME PERIODS

BACKGROUND

Field

Embodiments disclosed herein generally relate to electronic devices, and more specifically, techniques for reducing a capacitive baseline shift between different sensing frequencies through insertion of null time periods in burst periods.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

One embodiment described herein is a method comprising acquiring, responsive to driving a first sensing signal having a first sensing frequency onto a first group of a plurality of sensor electrodes within a first burst period, first capacitive measurements of first resulting signals received by a second group of the plurality of sensor electrodes, wherein acquiring first capacitive measurements comprises receiving a predefined number of current pulses during the first burst period. The method further comprises driving, responsive to determining to increase a sensing frequency from the first sensing frequency to a second sensing frequency, a second sensing signal having the second sensing frequency onto a third group of the plurality of sensor electrodes within a second burst period having a same length as the first burst period. The method further comprises acquiring, responsive to driving the second sensing signal, second capacitive measurements of second resulting signals received by a fourth group of the plurality of sensor electrodes. Acquiring second capacitive measurements comprises inserting, based at least on the second sensing frequency, one or more null time periods within the second burst period such that the same number of current pulses is received during the second burst period.

Another embodiment described herein is an input device comprising a plurality of sensor electrodes and a processing system configured to acquire, responsive to driving a first sensing signal having a first sensing frequency onto a first group of the plurality of sensor electrodes within a first burst period, first capacitive measurements of first resulting signals received by a second group of the plurality of sensor electrodes, wherein acquiring first capacitive measurements comprises receiving a predefined number of current pulses during the first burst period. The processing system is further configured to drive, responsive to determining to increase a sensing frequency from the first sensing frequency to a second sensing frequency, a second sensing signal having the second sensing frequency onto a third group of the plurality of sensor electrodes within a second burst period having a same length as the first burst period. The processing system is further configured to acquire, responsive to driving the second sensing signal, second capacitive measurements of second resulting signals received by a fourth group of the plurality of sensor electrodes. Acquiring second capacitive measurements comprises inserting, based at least on the second sensing frequency, one or more null time periods within the second burst period such that the same number of current pulses is received during the second burst period.

Another embodiment described herein is a processing system comprising a sensor module comprising circuitry for operating a plurality of sensor electrodes. The sensor module is configured to acquire, responsive to driving a first sensing signal having a first sensing frequency onto a first group of the plurality of sensor electrodes within a first burst period, first capacitive measurements of first resulting signals received by a second group of the plurality of sensor electrodes, wherein acquiring first capacitive measurements comprises receiving a predefined number of current pulses during the first burst period. The sensing module is further configured to drive, responsive to determining to increase a sensing frequency from the first sensing frequency to a second sensing frequency, a second sensing signal having the second sensing frequency onto a third group of the plurality of sensor electrodes within a second burst period having a same length as the first burst period. The sensing module is further configured to acquire, responsive to driving the second sensing signal, second capacitive measurements of second resulting signals received by a fourth group of the plurality of sensor electrodes. Acquiring second capacitive measurements comprises inserting, based at least on the second sensing frequency, one or more null time periods within the second burst period such that the same number of current pulses is received during the second burst period.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

Figure 1:
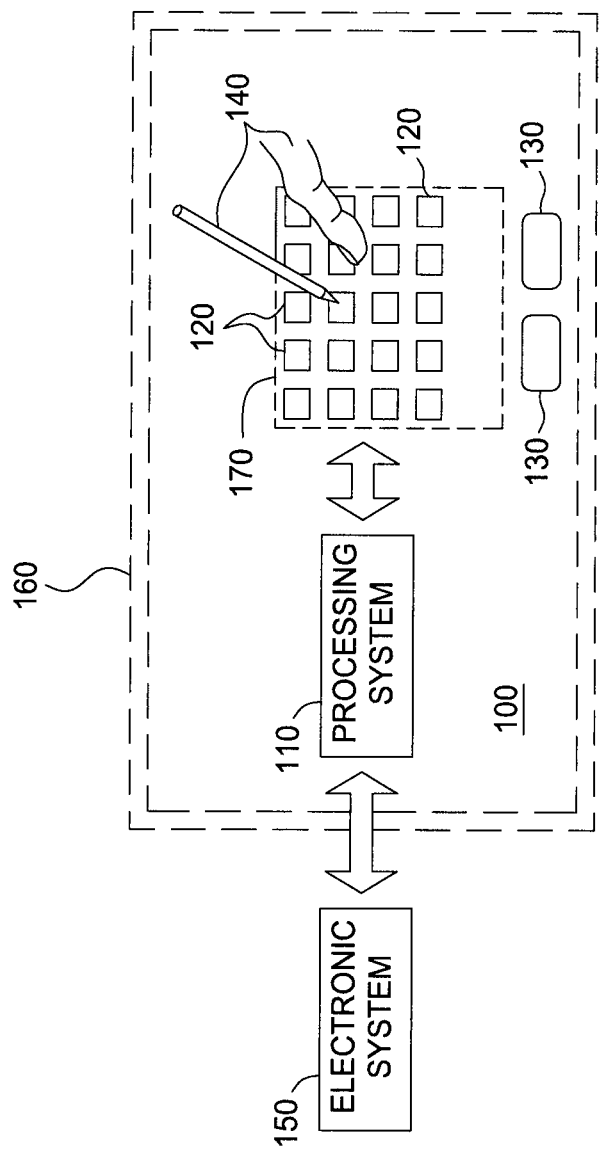
FIG. 1 is a schematic block diagram of an input device, according to embodiments described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding background, summary, or the following detailed description.

Various embodiments of the present technology provide input devices and methods for improving usability. An input device may include electrodes that are operated as sensor electrodes to detect interaction between the input device and an input object (e.g., a stylus or a user's finger). An input device generally drives a sensing signal onto sensor electrodes to acquire capacitive measurements. The sensing frequency corresponding to the capacitive sensing signal may be adaptively changed by the input device, e.g., based on detected interference measurements. However, capacitive measurements that are acquired at different sensing frequencies typically require some compensation, as the different sensing frequencies generally correspond to different capacitive baseline values, relative to which the capacitive measurements are determined.

According to various embodiments discussed herein, a processing system is configured to insert one or more null time periods within a burst period, where the burst period includes a plurality of sensing periods corresponding to the selected sensing frequency. The capacitive measurements are not acquired during the one or more null time periods, which can provide a desired effect on the (composite) capacitive measurements acquired over a particular burst period. Thus, the number, length, and/or arrangement of the null time periods in a burst period can be selected to provide a desired effect on capacitive measurements. Described another way, the properties of the null time periods can be selected such that the baseline capacitive measurements and/or the average current values will have a predefined relationship for different sensing frequencies. In some embodiments, the null time periods can be selected such that baseline capacitive measurements and/or average current values are substantially equal for different sensing frequencies. Having the predefined relationship allows the processing system to be capable of dynamically transitioning between sensing frequencies with reduced processing requirements related to correction and/or compensation. Some potential benefits for the processing system include reduced memory requirements (which can result in reduced cost and/or size), reduced power consumption, and improved interference susceptibility.

Exemplary Input Device Implementations

FIG. 1 is a schematic block diagram of an input device 100, in accordance with embodiments of the present technology. In various embodiments, input device 100 comprises a display device integrated with a sensing device. The input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Example communication protocols include Inter-Integrated Circuit ($I^2C$), Serial Peripheral Interface (SPI), Personal System/2(PS/2), Universal Serial Bus (USB), Bluetooth®, Radio Frequency (RF), and Infrared Data Association (IrDA) communication protocols.

In FIG. 1, the input device 100 is shown as a proximity sensor device (also often referred to as a "touchpad" or a "touch sensor device") configured to sense input provided by one or more input objects 140 in a sensing region 170. Example input objects include fingers and styli, as shown in FIG. 1.

Sensing region 170 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 170 extends from a surface of the input device 100 in one or more directions into space until signal-to-noise ratios prevent sufficiently accurate object detection. The distance to which this sensing region 170 extends in a particular direction, in various embodiments, may be on the order of less than a millimeter, millimeters, centimeters, or more, and may vary significantly with the type of sensing technology used and the accuracy desired. Thus, in some embodiments, sensing input may comprise no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 170 has a rectangular shape when projected onto an input surface of the input device 100.

The input device 100 may utilize any combination of sensor components and sensing technologies to detect user input in the sensing region 170. The input device 100 comprises a plurality of sensor electrodes 120 for detecting user input. The input device 100 may include one or more sensor electrodes 120 that are combined to form sensor electrodes. As several non-limiting examples, the input device 100 may use capacitive, elastive, resistive, inductive, magnetic acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensor electrodes 120 pickup loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensor electrodes 120 to create electric fields. In some capacitive implementations, separate sensor electrodes 120 may be ohmically shorted together to form larger sensor electrodes. Some capacitive implementations utilize resistive sheets, which may be uniformly resistive.

As discussed above, some capacitive implementations utilize "self-capacitance" (or "absolute capacitance") sensing methods based on changes in the capacitive coupling between sensor electrodes 120 and an input object. In one embodiment, processing system 110 is configured to drive a voltage with known amplitude onto the sensor electrode 120 and measure the amount of charge required to charge the sensor electrode to the driven voltage. In other embodiments, processing system 110 is configured to drive a known current and measure the resulting voltage. In various embodiments, an input object near the sensor electrodes 120 alters the electric field near the sensor electrodes 120, thus changing the measured capacitive coupling. In one implementation, an absolute capacitance sensing method operates by modulating sensor electrodes 120 with respect to a reference voltage (e.g. system ground) using a modulated signal, and by detecting the capacitive coupling between the sensor electrodes 120 and input objects 140.

Additionally as discussed above, some capacitive implementations utilize "mutual capacitance" (or "transcapacitance") sensing methods based on changes in the capacitive coupling between sensing electrodes. In various embodiments, an input object 140 near the sensing electrodes alters the electric field between the sensing electrodes, thus changing the measured capacitive coupling. In one implementation, a transcapacitive sensing method operates by detecting the capacitive coupling between one or more transmitter sensing electrodes (also "transmitter electrodes") and one or more receiver sensing electrodes (also "receiver electrodes") as further described below. Transmitter sensing electrodes may be electrically modulated relative to a reference voltage (e.g., system ground) to transmit a transmitter signals. Receiver sensing electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensing electrodes may be dedicated transmitter electrodes or receiver electrodes, or may be configured to both transmit and receive.

In FIG. 1, the processing system 110 is shown as part of the input device 100. The processing system 110 is configured to operate the hardware of the input device 100 to detect input in the sensing region 170. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensor electrode(s) 120 of the input device 100. In other embodiments, components of processing system 110 are physically separate with one or more components close to sensor electrode(s) 120 of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a mobile device such as a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensor electrodes 120 to detect input, identification modules configured to identify gestures such as mode changing gestures, and mode changing modules for changing operation modes. Processing system 110 may also comprise one or more controllers.

In some embodiments, the processing system 110 responds to user input (or lack of user input) in the sensing region 170 directly by causing one or more actions. Example actions include changing operation modes, as well as graphical user interface (GUI) actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensor electrode(s) 120 of the input device 100 to produce electrical signals indicative of input (or lack of input) in the sensing region 170. The processing system 110 may perform any appropriate amount of processing on the electrical signals in producing the information provided to the electronic system. For example, the processing system 110 may digitize analog electrical signals obtained from the sensor electrodes 120. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 170, or some other functionality. FIG. 1 shows buttons 130 near the sensing region 170 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 170 overlaps at least part of an active area of a display screen of the display device 160. For example, the input device 100 may comprise substantially transparent sensor electrodes 120 overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display device 160 may share physical elements. For example, some embodiments may utilize some of the same electrical components for displaying and sensing. As another example, the display device 160 may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Exemplary Sensor Electrode Implementations

Figure 2:
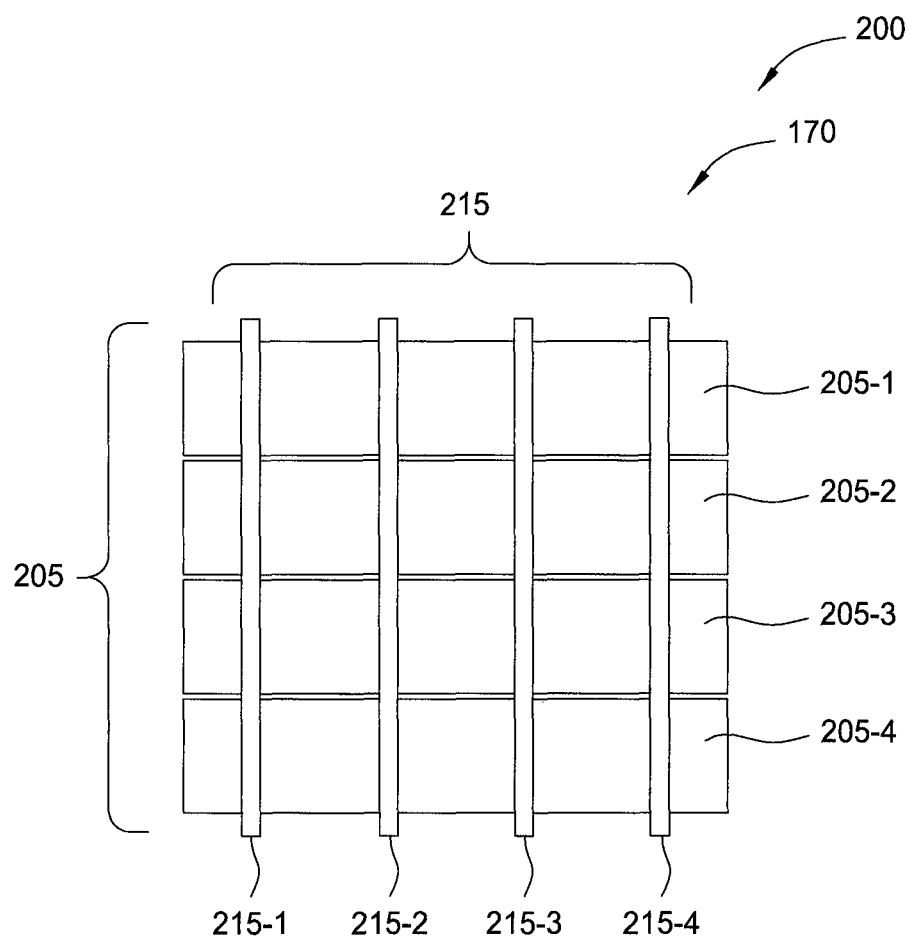
FIGS. 2 and 3 illustrate portions of exemplary sensor electrode implementations, according to embodiments described herein.
Figure 3:
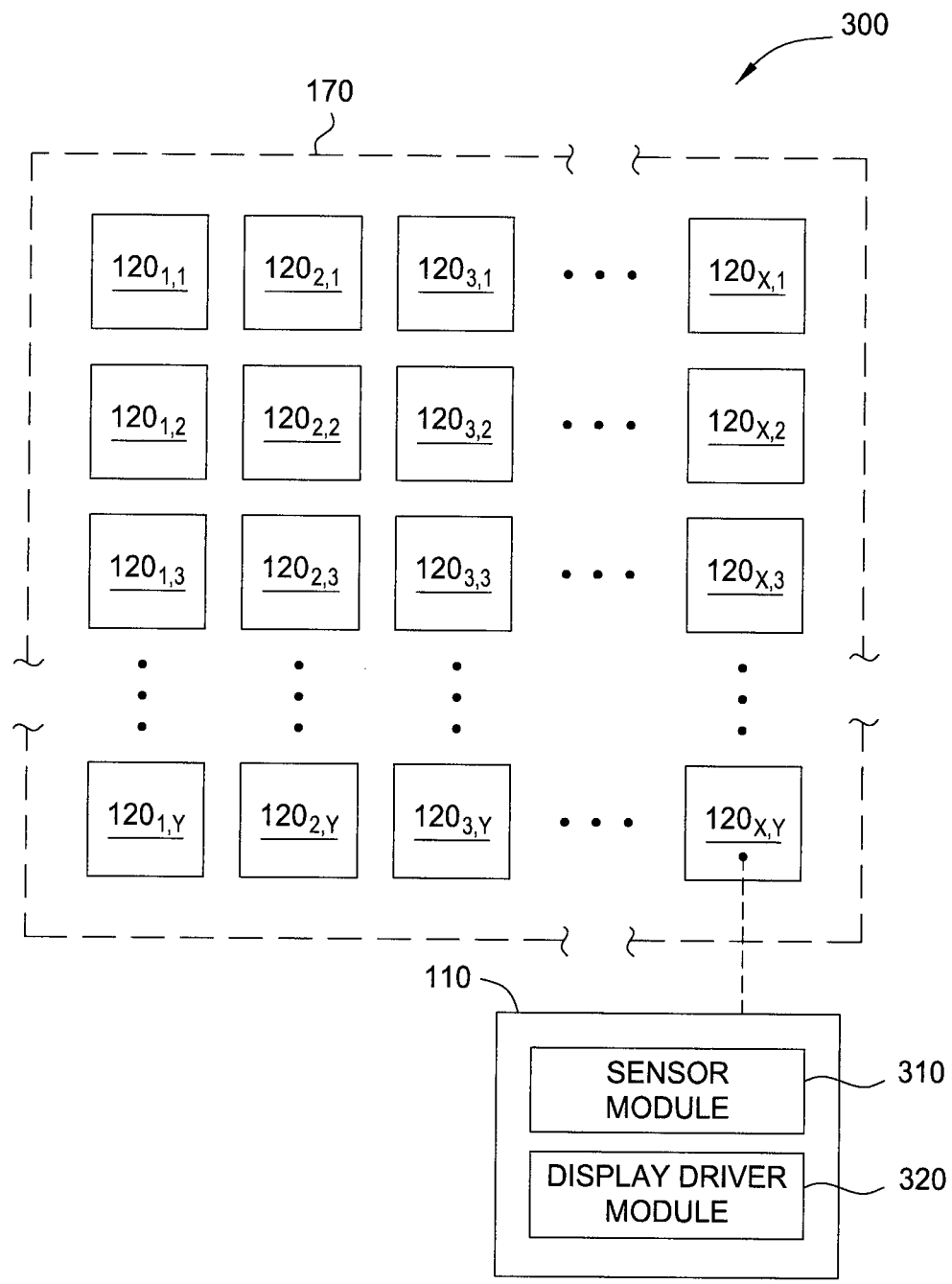

FIGS. 2 and 3 illustrate portions of exemplary sensor electrode arrangements, according to embodiments described herein. Specifically, arrangement 200 (FIG. 2) illustrates a portion of a pattern of sensor electrodes configured to sense in a sensing region 170 associated with the pattern, according to several embodiments. For clarity of illustration and description, FIG. 2 shows the sensor electrodes in a pattern of simple rectangles, and does not show various associated components. This pattern of sensing electrodes comprises a first plurality of sensor electrodes 205 (e.g., 205-1, 205-2, 205-3, 205-4), and a second plurality of sensor electrodes 215 (e.g., 215-1, 215-2, 215-3, 215-4). The sensor electrodes 205, 215 are each examples of the sensor electrodes 120 discussed above. In one embodiment, processing system 110 operates the first plurality of sensor electrodes 205 as a plurality of transmitter electrodes, and the second plurality of sensor electrodes 215 as a plurality of receiver electrodes. In another embodiment, processing system 110 operates the first plurality of sensor electrodes 205 and the second plurality of sensor electrodes 215 as absolute capacitive sensing electrodes.

The first plurality of sensor electrodes 205 and the second plurality of sensor electrodes 215 are typically ohmically isolated from each other. That is, one or more insulators separate the first plurality of sensor electrodes 205 and the second plurality of sensor electrodes 215 and prevent them from electrically shorting to each other. In some embodiments, the first plurality of sensor electrodes 205 and the second plurality of sensor electrodes 215 may be disposed on a common layer. The pluralities of sensor electrodes 205, 215 may be electrically separated by insulative material disposed between them at cross-over areas; in such constructions, the first plurality of sensor electrodes 205 and/or the second plurality of sensor electrodes 215 may be formed with jumpers connecting different portions of the same electrode. In some embodiments, the first plurality of sensor electrodes 205 and the second plurality of sensor electrodes 215 are separated by one or more layers of insulative material. In some embodiments, the first plurality of sensor electrodes 205 and the second plurality of sensor electrodes 215 are separated by one or more substrates; for example, they may be disposed on opposite sides of the same substrate, or on different substrates that are laminated together.

The pluralities of sensor electrodes 205, 215 may be formed into any desired shapes. Moreover, the size and/or shape of the sensor electrodes 205 may be different than the size and/or shape of the sensor electrodes 215. Additionally, sensor electrodes 205, 215 located on a same side of a substrate may have different shapes and/or sizes. In one embodiment, the first plurality of sensor electrodes 205 may be larger (e.g., having a larger surface area) than the second plurality of sensor electrodes 215, although this is not a requirement. In other embodiments, the first and second pluralities of sensor electrodes 205, 215 may have a similar size and/or shape.

In one embodiment, the first plurality of sensor electrodes 205 extends substantially in a first direction while the second plurality of sensor electrodes 215 extends substantially in a second direction. For example, and as shown in FIG. 2, the first plurality of sensor electrodes 205 extend in one direction, while the second plurality of sensor electrodes 215 extend in a direction substantially orthogonal to the sensor electrodes 205. Other orientations are also possible (e.g., parallel or other relative orientations).

In some embodiments, both the first and second pluralities of sensor electrodes 205, 215 are located outside of a plurality (or display stack) of layers that together form the display device 160. One example of a display stack may include layers such as a lens layer, a one or more polarizer layers, a color filter layer, one or more display electrodes layers, a display material layer, a thin-film transistor (TFT) glass layer, and a backlight layer. However, other implementations of a display stack are possible. In other embodiments, one or both of the first and second pluralities of sensor electrodes 205, 215 are located within the display stack, whether included as part of a display-related layer or a separate layer. For example, Vcom electrodes within a particular display electrode layer can be configured to perform both display updating and capacitive sensing.

Arrangement 300 of FIG. 3 illustrates a portion of a pattern of sensor electrodes configured to sense in sensing region 170, according to several embodiments. For clarity of illustration and description, FIG. 3 shows the sensor electrodes 120 in a pattern of simple rectangles and does not show other associated components. The exemplary pattern comprises an array of sensor electrodes $120_{X,Y}$ arranged in X columns and Y rows, wherein X and Y are positive integers, although one of X and Y may be zero. It is contemplated that the pattern of sensor electrodes 120 may have other configurations, such as polar arrays, repeating patterns, non-repeating patterns, a single row or column, or other suitable implementation. Further, in various embodiments the number of sensor electrodes 120 may vary from row to row and/or column to column. In one embodiment, at least one row and/or column of sensor electrodes 120 is offset from the others, such it extends further in at least one direction than the others. The sensor electrodes 120 is coupled to the processing system 110 and utilized to determine the presence (or lack thereof) of an input object in the sensing region 170.

In a first mode of operation, the arrangement of sensor electrodes 120 ($120_{1,1}$, $120_{2,1}$, $120_{3,1}$, ..., $120_{X,Y}$) may be utilized to detect the presence of an input object via absolute sensing techniques. That is, processing system 110 is configured to modulate sensor electrodes 120 to acquire measurements of changes in capacitive coupling between the modulated sensor electrodes 120 and an input object to determine the position of the input object. Processing system 110 is further configured to determine changes of absolute capacitance based on a measurement of resulting signals received with sensor electrodes 120 which are modulated.

In some embodiments, the arrangement 300 includes one or more grid electrodes (not shown) that are disposed between at least two of the sensor electrodes 120. The grid electrode(s) may at least partially circumscribe the plurality of sensor electrodes 120 as a group, and may also, or in the alternative, completely or partially circumscribe one or more of the sensor electrodes 120. In one embodiment, the grid electrode is a planar body having a plurality of apertures, where each aperture circumscribes a respective one of the sensor electrodes 120. In other embodiments, the grid electrode(s) comprise a plurality of segments that may be driven individually or in groups or two or more segments. The grid electrode(s) may be fabricated similar to the sensor electrodes 120. The grid electrode(s), along with sensor electrodes 120, may be coupled to the processing system 110 utilizing conductive routing traces and used for input object detection.

The sensor electrodes 120 are typically ohmically isolated from each other, and are also ohmically isolated from the grid electrode(s). That is, one or more insulators separate the sensor electrodes 120 and grid electrode(s) and prevent them from electrically shorting to each other. In some embodiments, the sensor electrodes 120 and grid electrode(s) are separated by an insulative gap, which may be filled with an electrically insulating material, or may be an air gap. In some embodiments, the sensor electrodes 120 and the grid electrode(s) are vertically separated by one or more layers of insulative material. In some other embodiments, the sensor electrodes 120 and the grid electrode(s) are separated by one or more substrates; for example, they may be disposed on opposite sides of the same substrate, or on different substrates. In yet other embodiments, the grid electrode(s) may be composed of multiple layers on the same substrate, or on different substrates. In one embodiment, a first grid electrode may be formed on a first substrate (or a first side of a substrate) and a second grid electrode may be formed on a second substrate (or a second side of a substrate). For example, a first grid electrode comprises one or more common electrodes disposed on a thin-film transistor (TFT) layer of the display device 160 (FIG. 1) and a second grid electrode is disposed on the color filter glass of the display device 160. The dimensions of the first and second grid electrodes can be equal or differ in at least one dimension.

In a second mode of operation, the sensor electrodes 120 ($120_{1,1}$, $120_{2,1}$, $120_{3,1}$, ..., $120_{X,Y}$) may be utilized to detect the presence of an input object via transcapacitive sensing techniques when a transmitter signal is driven onto the grid electrode(s). That is, processing system 110 is configured to drive the grid electrode(s) with a transmitter signal and to receive resulting signals with each sensor electrode 120, where a resulting signal comprising effects corresponding to the transmitter signal, which is utilized by the processing system 110 or other processor to determine the position of the input object.

In a third mode of operation, the sensor electrodes 120 may be split into groups of transmitter and receiver electrodes utilized to detect the presence of an input object via transcapacitive sensing techniques. That is, processing system 110 may drive a first group of sensor electrodes 120 with a transmitter signal and receive resulting signals with the second group of sensor electrodes 120, where a resulting signal comprising effects corresponding to the transmitter signal. The resulting signal is utilized by the processing system 110 or other processor to determine the position of the input object.

The input device 100 may be configured to operate in any one of the modes described above. The input device 100 may also be configured to switch between any two or more of the modes described above.

The areas of localized capacitive sensing of capacitive couplings may be termed "capacitive pixels," "touch pixels," "tixels," etc. Capacitive pixels may be formed between an individual sensor electrode 120 and a reference voltage in the first mode of operation, between the sensor electrodes 120 and grid electrode(s) in the second mode of operation, and between groups of sensor electrodes 120 used as transmitter and receiver electrodes (e.g., arrangement 200 of FIG. 2). The capacitive coupling changes with the proximity and motion of input objects in the sensing region 170 associated with the sensor electrodes 120, and thus may be used as an indicator of the presence of the input object in the sensing region of the input device 100.

In some embodiments, the sensor electrodes 120 are "scanned" to determine these capacitive couplings. That is, in one embodiment, one or more of the sensor electrodes 120 are driven to transmit transmitter signals. Transmitters may be operated such that one transmitter electrode transmits at one time, or such that multiple transmitter electrodes transmit at the same time. Where multiple transmitter electrodes transmit simultaneously, the multiple transmitter electrodes may transmit the same transmitter signal and thereby produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined. In one embodiment, multiple transmitter electrodes may simultaneously transmit the same transmitter signal while the receiver electrodes receive the effects and are measured according to a scanning scheme.

The sensor electrodes 120 configured as receiver sensor electrodes may be operated singly or multiply to acquire resulting signals. The resulting signals may be used to determine measurements of the capacitive couplings at the capacitive pixels. Processing system 110 may be configured to receive with the sensor electrodes 120 in a scanning fashion and/or a multiplexed fashion to reduce the number of simultaneous measurements to be made, as well as the size of the supporting electrical structures. In one embodiment, one or more sensor electrodes are coupled to a receiver of processing system 110 via a switching element such as a multiplexer or the like. In such an embodiment, the switching element may be internal to processing system 110 or external to processing system 110. In one or more embodiments, the switching elements may be further configured to couple a sensor electrode 120 with a transmitter or other signal and/or voltage potential. In one embodiment, the switching element may be configured to couple more than one receiver electrode to a common receiver at the same time.

In other embodiments, "scanning" sensor electrodes 120 to determine these capacitive couplings comprises modulating one or more of the sensor electrodes and measuring an absolute capacitance of the one or more sensor electrodes. In another embodiment, the sensor electrodes may be operated such that more than one sensor electrode is driven and received with at a time. In such embodiments, an absolute capacitive measurement may be obtained from each of the one or more sensor electrodes 120 simultaneously. In one embodiment, each of the sensor electrodes 120 are simultaneously driven and received with, obtaining an absolute capacitive measurement simultaneously from each of the sensor electrodes 120. In various embodiments, processing system 110 may be configured to selectively modulate a portion of sensor electrodes 120. For example, the sensor electrodes may be selected based on, but not limited to, an application running on the host processor, a status of the input device, and an operating mode of the sensing device. In various embodiments, processing system 110 may be configured to selectively shield at least a portion of sensor electrodes 120 and to selectively shield or transmit with the grid electrode(s) 122 while selectively receiving and/or transmitting with other sensor electrodes 120.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In any of the above embodiments, multiple sensor electrodes 120 may be ganged together such that the sensor electrodes 120 are simultaneously modulated or simultaneously received with. As compared to the methods described above, ganging together multiple sensor electrodes may produce a coarse capacitive image that may not be usable to discern precise positional information. However, a coarse capacitive image may be used to sense presence of an input object. In one embodiment, the coarse capacitive image may be used to move processing system 110 or the input device 100 out of a "doze" mode or low-power mode. In one embodiment, the coarse capacitive image may be used to move a capacitive sensing IC out of a "doze" mode or low-power mode. In another embodiment, the coarse capacitive image may be used to move at least one of a host IC and a display driver out of a "doze" mode or low-power mode. The coarse capacitive image may correspond to the entire sensor area or only to a portion of the sensor area.

The background capacitance of the input device 100 is the capacitive image associated with no input object in the sensing region 170. The background capacitance changes with the environment and operating conditions, and may be estimated in various ways. For example, some embodiments take "baseline images" when no input object is determined to be in the sensing region 170, and use those baseline images as estimates of their background capacitances. The background capacitance or the baseline capacitance may be present due to stray capacitive coupling between two sensor electrodes, where one sensor electrode is driven with a modulated signal and the other is held stationary relative to system ground, or due to stray capacitive coupling between a receiver electrode and nearby modulated electrodes. In many embodiments, the background or baseline capacitance may be relatively stationary over the time period of a user input gesture.

Capacitive images can be adjusted for the background capacitance of the input device 100 for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, one or more of the sensor electrodes 120 comprise one or more display electrodes used in updating the display of the display screen. The display electrodes may comprise one or more elements of the active matrix display such as one or more segments of a segmented Vcom electrode (common electrode(s)), a source drive line, gate line, an anode sub-pixel electrode or cathode pixel electrode, or any other suitable display element. These display electrodes may be disposed on an appropriate display screen substrate. For example, the common electrodes may be disposed on a transparent substrate (a glass substrate, TFT glass, or any other transparent material) in some display screens (e.g., In-Plane Switching (IPS), Fringe Field Switching (FFS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, the display electrode can also be referred to as a "combination electrode," since it performs multiple functions. In various embodiments, each of the sensor electrodes 120 comprises one or more common electrodes. In other embodiments, at least two sensor electrodes 120 may share at least one common electrode. While the following description may describe that sensor electrodes 120 and/or grid electrode(s) comprise one or more common electrodes, various other display electrodes as describe above may also be used in conjunction with the common electrode or as an alternative to the common electrodes. In various embodiments, the sensor electrodes 120 and grid electrode(s) comprise the entire common electrode layer (Vcom electrode).

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In various embodiments, the capacitive frame rate is an integer multiple of the display frame rate. In other embodiments, the capacitive frame rate is a fractional multiple of the display frame rate. In yet further embodiments, the capacitive frame rate may be any fraction or integer multiple of the display frame rate. In one or more embodiments, the display frame rate may change (e.g., to reduce power or to provide additional image data such as a 3D display information) while touch frame rate maintains constant. In other embodiment, the display frame rate may remain constant while the touch frame rate is increased or decreased.

Continuing to refer to FIG. 3, the processing system 110 coupled to the sensor electrodes 120 includes a sensor module 310 and optionally, a display driver module 320. The sensor module 310 includes circuitry configured to drive at least one of the sensor electrodes 120 for capacitive sensing during periods in which input sensing is desired. In one embodiment, the sensor module 310 is configured to drive a modulated signal onto the at least one sensor electrode 120 to detect changes in absolute capacitance between the at least one sensor electrode and an input object. In another embodiment, the sensor module 310 is configured to drive a transmitter signal onto the at least one sensor electrode 120 to detect changes in a transcapacitance between the at least one sensor electrode and another sensor electrode 120. The modulated and transmitter signals are generally varying voltage signals comprising a plurality of voltage transitions over a period of time allocated for input sensing. In various embodiments, the sensor electrodes 120 and/or grid electrode(s) may be driven differently in different modes of operation. In one embodiment, the sensor electrodes 120 and/or grid electrode(s) may be driven with signals (modulated signals, transmitter signals and/or shield signals) that may differ in any one of phase, amplitude, and/or shape. In various embodiments, the modulated signal and transmitter signal are similar in at least one shape, frequency, amplitude, and/or phase. In other embodiments, the modulated signal and the transmitter signals are different in frequency, shape, phase, amplitude, and phase. The sensor module 310 may be selectively coupled one or more of the sensor electrodes 120 and/or the grid electrode(s). For example, the sensor module 310 may be coupled selected portions of the sensor electrodes 120 and operate in either an absolute or transcapacitive sensing mode. In another example, the sensor module 310 may be a different portion of the sensor electrodes 120 and operate in either an absolute or transcapacitive sensing mode. In yet another example, the sensor module 310 may be coupled to all the sensor electrodes 120 and operate in either an absolute or transcapacitive sensing mode.

The sensor module 310 is configured to operate the grid electrode(s) as a shield electrode that may shield sensor electrodes 120 from the electrical effects of nearby conductors. In one embodiment, the processing system is configured to operate the grid electrode(s) as a shield electrode that may "shield" sensor electrodes 120 from the electrical effects of nearby conductors, and to guard the sensor electrodes 120 from grid electrode(s), at least partially reducing the parasitic capacitance between the grid electrode(s) and the sensor electrodes 120. In one embodiment, a shielding signal is driven onto the grid electrode(s). The shielding signal may be a ground signal, such as the system ground or other ground, or any other constant voltage (i.e., non-modulated) signal. In another embodiment, operating the grid electrode(s) as a shield electrode may comprise electrically floating the grid electrode. In one embodiment, grid electrode(s) are able to operate as an effective shield electrode while being electrode floated due to its large coupling to the other sensor electrodes. In other embodiment, the shielding signal may be referred to as a "guarding signal" where the guarding signal is a varying voltage signal having at least one of a similar phase, frequency, and amplitude as the modulated signal driven on to the sensor electrodes. In one or more embodiment, routing traces may be shielded from responding to an input object due to routing beneath the grid electrode(s) and/or sensor electrodes 120, and therefore may not be part of the active sensor electrodes, shown as sensor electrodes 120.

In one or more embodiments, capacitive sensing (or input sensing) and display updating may occur during at least partially overlapping periods. For example, as a common electrode is driven for display updating, the common electrode may also be driven for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time as the display update period. In such embodiments, the non-display update period may be referred to as a "long horizontal blanking period," "long h-blanking period" or a "distributed blanking period," where the blanking period occurs between two display updating periods and is at least as long as a display update period. In one embodiment, the non-display update period occurs between display line update periods of a frame and is long enough to allow for multiple transitions of the transmitter signal to be driven onto the sensor electrodes 120. In other embodiments, the non-display update period may comprise horizontal blanking periods and vertical blanking periods. Processing system 110 may be configured to drive sensor electrodes 120 for capacitive sensing during any one or more of or any combination of the different non-display update times. Synchronization signals may be shared between sensor module 310 and display driver module 320 to provide accurate control of overlapping display updating and capacitive sensing periods with repeatably coherent frequencies and phases. In one embodiment, these synchronization signals may be configured to allow the relatively stable voltages at the beginning and end of the input sensing period to coincide with display update periods with relatively stable voltages (e.g., near the end of a input integrator reset time and near the end of a display charge share time). A modulation frequency of a modulated or transmitter signal may be at a harmonic of the display line update rate, where the phase is determined to provide a nearly constant charge coupling from the display elements to the receiver electrode, allowing this coupling to be part of the baseline image.

The sensor module 310 includes circuitry configured to receive resulting signals with the sensor electrodes 120 and/or grid electrode(s) comprising effects corresponding to the modulated signals or the transmitter signals during periods in which input sensing is desired. The sensor module 310 may determine a position of the input object in the sensing region 170 or may provide a signal including information indicative of the resulting signal to another module or processor, for example, a determination module or a processor of an associated electronic device 150 (i.e., a host processor), for determining the position of the input object in the sensing region 170.

The display driver module 320 may be included in or separate from the processing system 110. The display driver module 320 includes circuitry configured to provide display image update information to the display of the display device 160 during non-sensing (e.g., display updating) periods.

In one embodiment, the processing system 110 comprises a first integrated controller comprising the display driver module 320 and at least a portion of the sensor module 310 (i.e., transmitter module and/or receiver module). In another embodiment, the processing system 110 comprises a first integrated controller comprising the display driver module 320 and a second integrated controller comprising the sensor module 310. In yet another embodiment, the processing system comprises a first integrated controller comprising display driver module 320 and a first portion of the sensor module 310 (e.g., one of a transmitter module and a receiver module) and a second integrated controller comprising a second portion of the sensor module 310 (e.g., the other one of the transmitter and receiver modules). In those embodiments comprising multiple integrated circuits, a synchronization mechanism may be coupled between them, configured to synchronize display updating periods, sensing periods, transmitter signals, display update signals, and the like.

Exemplary Arrangements Using Null Time Periods

Figure 4:
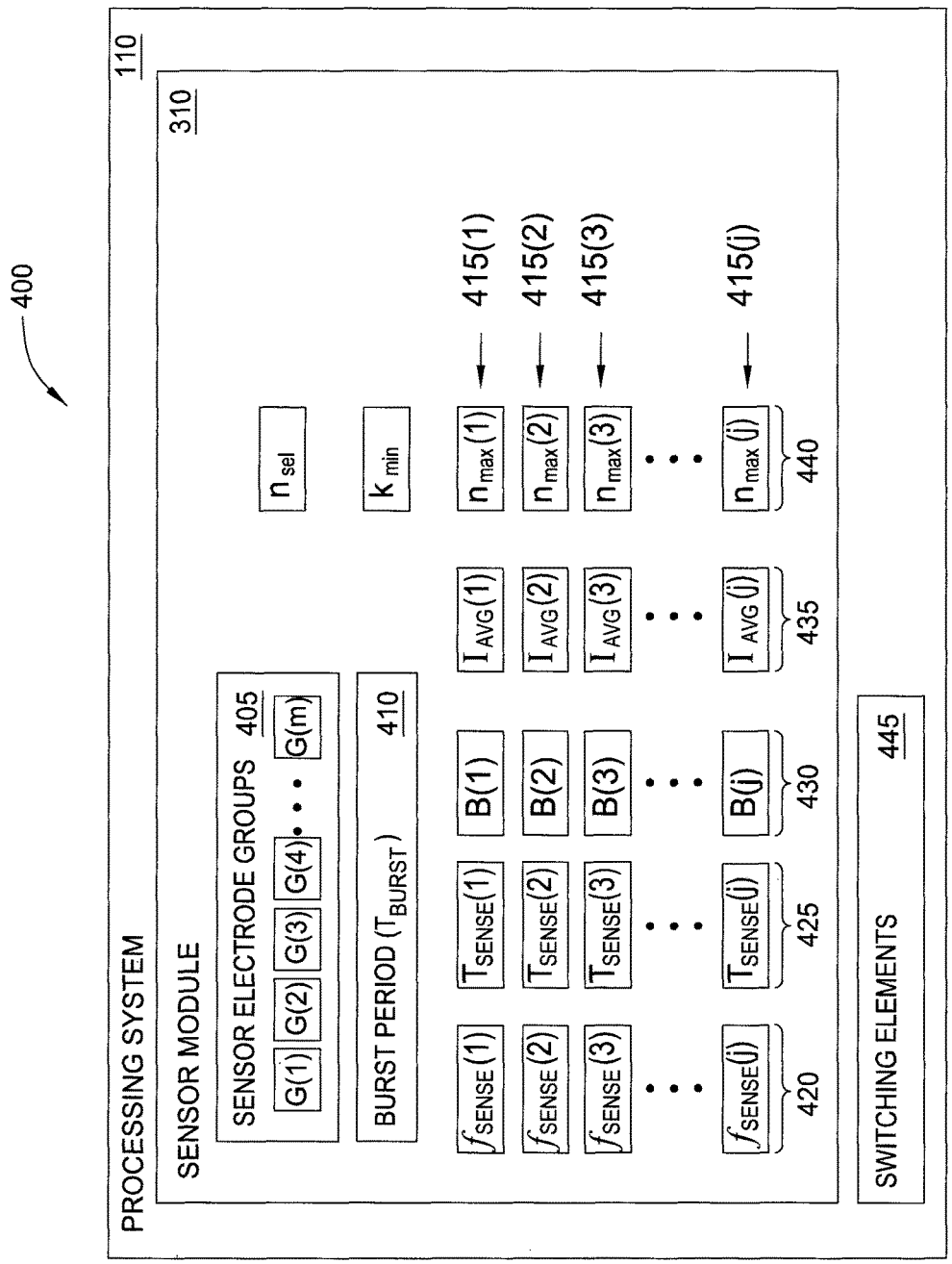
FIG. 4 illustrates an exemplary processing system for inserting null time periods within sensing burst periods, according to embodiments described herein.

FIG. 4 illustrates an exemplary processing system for inserting null time periods within sensing burst periods, according to embodiments described herein. More specifically, arrangement 400 provides one possible implementation of the processing system 110 discussed above. Further, the arrangement 400 is capable of use in conjunction with various embodiments discussed herein, such as the arrangements 200, 300 of sensor electrodes discussed above with respect to FIGS. 2 and 3.

Within arrangement 400, the sensor module 310 comprises a plurality of sensor electrode groups 405. Each group G(1), G(2), G(3), G(4), . . . , G(m) of the plurality of sensor electrode groups 405 corresponds to at least one sensor electrode of the plurality of sensor electrodes that are coupled with the processing system 110. The processing system 110 performs capacitive sensing by operating selected groups of the groups G(1), G(2), G(3), G(4), . . . , G(m) of sensor electrodes to transmit capacitive sensing signals and/or to receive resulting signals. For example, in a transcapacitive sensing implementation, a first group G1 of one or more sensor electrodes is driven with a capacitive sensing signal, and a second group G2 including one or more other sensor electrodes receives resulting signals. In another example, in an absolute capacitive sensing implementation, a particular group G1 of sensor electrodes is driven with a capacitive sensing signal, and the sensor electrodes of the group G1 are also used to receive the resulting signals.

The sensor module 310 is configured to drive sensing signals having desired electrical properties onto the selected sensor electrode groups 405. As shown, the sensor module 310 is configured to generate a plurality of sensing signals 415(1), 415(2), 415(3), . . . , 415(j) (collectively referred to as a plurality of sensing signals 415). The sensing signals 415 may have any suitable repeating waveform, such as square waves, sine waves, triangle waves, and so forth. Each sensing signal 415(1), 415(2), 415(3), . . . , 415(j) has a number of properties, at least one of which differs from other ones of the sensing signals 415. As shown, each sensing signal 415(1), 415(2), 415(3), . . . , 415(j) has a corresponding sensing frequency $f_{SENSE}(1)$, $f_{SENSE}(2)$, $f_{SENSE}(3)$, . . . , $f_{SENSE}(j)$ (collectively referred to as a plurality of sensing frequencies 420) and a corresponding sensing period $T_{SENSE}(1)$, $T_{SENSE}(2)$, $T_{SENSE}(3)$, . . . , $T_{SENSE}(j)$ (collectively referred to as a plurality of sensing periods 425). In some embodiments, the sensor module 310 is configured to dynamically select different sensing frequencies $f_{SENSE}(1)$, $f_{SENSE}(2)$, $f_{SENSE}(3)$, . . . , $f_{SENSE}W$, which may be beneficial to avoid sources of interference and/or to otherwise improve sensing performance, reduce power consumption, and so forth. In some cases, the plurality of sensing frequencies 420 are predefined. In other cases, some or all of the plurality of sensing frequencies 420 may be dynamically determined by the sensor module 310.

The sensor module 310 is configured to drive the selected sensing signal 415(1), 415(2), 415(3), . . . , 415(j) during predefined burst periods 410 (having a length defined as $T_{BURST}$). Generally, each burst period 410 is sized to include a plurality of sensing periods of the selected sensing period $T_{SENSE}(1)$, $T_{SENSE}(2)$, $T_{SENSE}(3)$, . . . , $T_{SENSE}(j)$. In one non-limiting example, values of the length $T_{BURST}$ are selected from a range of about 100 microseconds (μs) to about 1 millisecond (ms). In some embodiments, the burst periods 410 are timed to coincide with non-display update periods, e.g., occurring during horizontal blanking periods, long-horizontal blanking periods, vertical blanking periods, and so forth. This can be advantageous for mitigating or otherwise avoiding noise associated with driving signals onto nearby display electrodes for performing display updating. In other embodiments, the burst periods 410 may occur at least partly overlapping with display update periods.

The sensor module 310 includes a plurality of acquired baseline capacitive measurements 430 (individually, baseline capacitive measurements B(1), B(2), . . . , B(j)) that correspond to the plurality of sensing frequencies 420. Each of the plurality of baseline capacitive measurements 430 corresponds to a particular sensing frequency 420 (e.g., B(2)

corresponds to $f_{SENSE}(2)$) and represents measurements that are acquired with a reference input level, such as having no input object present. Each baseline capacitive measurement $B(1)$, $B(2)$, $B(j)$ corresponds to an average current value $I_{AVG}(1)$, $I_{AVG}(2)$, $I_{AVG}(3)$, $I_{AVG}(j)$ (collectively, referred to as a plurality of average current values 435) that is measured by the sensor module 310. For example, a first-order representation of an average current value $I_{AVG}(1)$ may be described as $(B(1) \times V_{TX} \times f_{SENSE}(1) \times A)$, where $V_{TX}$ represents an amplitude of a voltage waveform $V_{TX}$, and where A represents a gain value associated with a current conveyor.

As the sensing frequencies $f_{SENSE}(1)$, $f_{SENSE}(2)$, $f_{SENSE}(3)$, ..., $f_{SENSE}(j)$ are different, the corresponding sensing periods $T_{SENSE}(1)$, $T_{SENSE}(2)$, $T_{SENSE}(3)$, ..., $T_{SENSE}(j)$ are also different. As a result, different numbers of the sensing periods $T_{SENSE}(1)$, $T_{SENSE}(2)$, $T_{SENSE}(3)$, ..., $T_{SENSE}(j)$ may fit into each burst period 410. For example, sensing signals with faster sensing frequencies have correspondingly shorter sensing periods; therefore, a larger number of the shorter sensing periods may fit in a burst period 410, when compared with a sensing signal with a slower sensing frequency. For this reason, using sensing signals with faster sensing frequencies tends to improve sensing performance, as more sensing periods may be included within a limited time budget available for the burst periods 410.

However, in cases where the sensor module 310 is configured to acquire measurements for as many sensing periods as possible within the burst period 410, the baseline capacitive measurements 430 may differ depending on which of the plurality of sensing frequencies 420 is selected. Thus, for a processing system 110 that dynamically selects different sensing frequencies, a correction or compensation of the capacitive measurements (such as scaling and/or shifting) may be required to provide consistent results for detecting inputs at different sensing frequencies. Performing correction or compensation of the capacitive measurements may increases processing costs (e.g., power consumed, time required for additional processing cycles, and so forth) of the processing system 110.

In various embodiments described herein, the sensor module 310 is configured to insert one or more null time periods within a burst period 410. Generally, capacitive measurements are not acquired during null time period(s), which can provide a desired effect on the (composite) capacitive measurements acquired by the sensor module 310 over a particular burst period 410.

In some embodiments, the number, length, and/or arrangement of the null time periods included in a burst period are selected to provide a desired effect on capacitive measurements. Described another way, the properties of the null time periods can be selected such that the plurality of baseline capacitive measurements 430 and/or the plurality of average current values 435 have a predefined relationship for the different sensing frequencies 420. In some embodiments, the number, length, and/or arrangement of the null time periods are selected to provide baseline capacitive measurements 430 and/or average current values 435 that are substantially equal for different sensing frequencies 420. Having equal baseline capacitive measurements 430 can eliminate (or at least significantly reduce) need to correct or compensate subsequently acquired capacitive measurements.

In other embodiments, the number, length, and/or arrangement of the null time periods are selected to provide baseline capacitive measurements 430 having any other suitable relationship, such as a linear relationship for different sensing frequencies 420. Thus, for any transitions between different ones of the sensing frequencies 420 during operation of the processing system 110, the corresponding baseline capacitive measurements 430 and/or corresponding average current values 435 will have a predictable relationship, which simplifies any correction or compensation that may be needed to normalize capacitive sensing measurements across the selected sensing frequencies 420. In some cases, the predictable relationship may allow the processing system 110 to avoid the need for calibrating and storing compensation values for each individual sensor electrode or for each capacitive pixel, which reduces memory requirements and associated cost and size of the processing system 110.

Including the null time periods within burst periods 410 may provide additional advantages for the processing system 110. In some embodiments, during the null time periods certain transmit periods of the sensing signal 415 are not driven onto the sensor electrodes. In these cases, transmitter and/or receiver circuitry of the processing system 110 can be disabled during the null time periods, which can reduce an overall power consumption of the processing system 110. In some embodiments, transmitter(s) and/or demodulator(s) of the processing system 110 may be disabled during null time periods.

Each sensing period occurring within a burst period 410 may correspond to a current pulse generated by a demodulator (or mixer) of the processing system 110. In some embodiments, the properties of the null time periods are selected such that a number of current pulses that occur within each burst period 410 will be the same no matter which sensing frequency $f_{SENSE}(1)$, $f_{SENSE}(2)$, $f_{SENSE}(3)$, ... $f_{SENSE}(j)$ is selected.

As mentioned above, faster sensing frequencies have correspondingly shorter sensing periods, such that a larger number of the shorter sensing periods may fit in a burst period 410 of a given size (i.e., $T_{BURST}$), when compared with a sensing signal having a slower sensing frequency. Therefore, due to the larger number of the shorter sensing periods, faster sensing frequencies can also generally correspond to a larger number of current pulses within the burst period 410.

In some cases, the characteristics of the current pulses that are generated by the demodulator may be largely defined by the particular physical implementation of the processing system 110 and the coupled sensor electrodes. For example, the current pulses may have a shape that is based on a time constant associated with the resistance and capacitance of the networked sensor electrodes. The characteristics of the current pulses may remain substantially unchanged despite changes in sensing frequency $f_{SENSE}(1)$, $f_{SENSE}(2)$, $f_{SENSE}(3)$, ..., $f_{SENSE}(j)$, and therefore in certain cases it is reasonable to assume that each current pulse provides a substantially equal amount of current for baseline capacitive measurements. As a result, the average current values 435 for the different baseline capacitive measurements 430 can be controlled simply by adjusting the number of current pulses included in each burst period 410. For example, by controlling the number of current pulses to remain constant across the different sensing frequencies $f_{SENSE}(1)$, $f_{SENSE}(2)$, $f_{SENSE}(3)$, ..., $f_{SENSE}(j)$, the average current values $I_{AVG}(1)$, $I_{AVG}(2)$, $I_{AVG}(3)$, ..., $I_{AVG}(j)$ will be substantially equal.

In some embodiments, the sensor module 310 includes maximum numbers of current pulses $n_{max}(1)$, $n_{max}(2)$, $n_{max}(3)$, ..., $n_{max}(j)$ (collectively, a plurality of maximum numbers 440) that can fit into the burst period 410 of length $T_{BURST}$ corresponding to each of the different sensing frequencies $f_{SENSE}(1)$, $f_{SENSE}(2)$, $f_{SENSE}(3)$, ..., $f_{SENSE}(j)$.

Alternatively, maximum numbers of transmit periods for the sensing signals 415 can be substituted in the discussion for the maximum numbers of current pulses $n_{max}(1)$, $n_{max}(2)$, $n_{max}(3)$, ..., $n_{max}(j)$. In some cases, each maximum number of current pulses $n_{max}(1)$, $n_{max}(2)$, $n_{max}(3)$, ..., $n_{max}(j)$ is an integer value, which may include the sensor module 310 rounding down (also described as a "floor function" or "greatest integer function") a calculated value. By controlling each maximum number of current pulses $n_{max}(1)$, $n_{max}(2)$, $n_{max}(3)$, ..., $n_{max}(j)$ to be an integer value, partial current pulses occurring at the end of each burst period 410 may be avoided. Further, avoiding partial current pulses supports the assumption that each current pulse provides a substantially equal amount of current for baseline capacitive measurements.

In some embodiments, the sensor module 310 is configured to select a number of current pulses $n_{sel}$ to be included in each burst period 410 for each of the sensing frequencies $f_{SENSE}(1)$, $f_{SENSE}(2)$, $f_{SENSE}(3)$, ..., $f_{SENSE}(j)$. In other embodiments, the number of current pulses $n_{sel}$ can be determined relative to a grouping of two or more (but less than all) of the sensing frequencies $f_{SENSE}(1)$, $f_{SENSE}(2)$, $f_{SENSE}(3)$, ..., $f_{SENSE}(j)$. In one embodiment, each of the sensing frequencies $f_{SENSE}(1)$, $f_{SENSE}(2)$, $f_{SENSE}(3)$, ..., $f_{SENSE}(j)$ is predetermined, and the sensor module 310 is configured to determine the number of current pulses $n_{sel}$ based on the slowest sensing frequency. Described another way, the number of current pulses $n_{sel}$ can determined as a value that is less than or equal to the maximum number of current pulses $n_{max}(1)$, $n_{max}(2)$, $n_{max}(3)$, ..., $n_{max}(j)$ corresponding to the slowest of the sensing frequencies $f_{SENSE}(1)$, $f_{SENSE}(2)$, $f_{SENSE}(3)$, ..., $f_{SENSE}(j)$. In this way, the number of current pulses $n_{sel}$ may be maintained constant for transitions between any of the different sensing frequencies $f_{SENSE}(1)$, $f_{SENSE}(2)$, $f_{SENSE}(3)$, ..., $f_{SENSE}(j)$ during operation of the sensor module 310, which can produce substantially constant average current value $I_{AVG}(1)$, $I_{AVG}(2)$, $I_{AVG}(3)$, ..., $I_{AVG}(j)$ for the different baseline capacitive measurements B(1), B(2), B(3), ... B(j).

The sensor module 310 is further configured to determine properties of the null time period(s) based on the number of current pulses $n_{sel}$. For example, if a first sensing signal 415(1) has a faster sensing frequency $f_{SENSE}(1)$ than a sensing frequency $f_{SENSE}(2)$ of a second sensing signal 415(2), the number of current pulses $n_{sel}$ occupy a relatively smaller proportion of the burst period 410 for the faster sensing frequency $f_{SENSE}(1)$. As a result, the sensor module 310 may insert more null time period(s) and/or longer null time period(s) in each burst period 410 for the faster sensing frequency $f_{SENSE}(1)$ as compensation for the smaller proportion of the burst period 410 used by the number of current pulses $n_{sel}$.

As will be described in further detail below, the processing system 110 may insert the null time period(s) in any suitable arrangement in a burst period 410. In some embodiments, the null time period(s) may be located at a beginning (that is, occurring before the number of current pulses $n_{sel}$) or at an end (that is, occurring after the number of current pulses $n_{sel}$) of a burst period 410. In other embodiments, the null time period(s) may be distributed between current pulses within a burst period 410. In one particular embodiment, a plurality of null time periods are evenly distributed through a burst period 410. The even distribution of the null time periods can beneficially provide a reduced interference susceptibility of the sensor module 310. Other distributions of the null time periods within a burst period 410 are possible for controlling a desired interference susceptibility of the sensor module 310, such as providing a desired window function (e.g., Hamming window, Hanning window, and so forth).

Generally, the sensing signals 415(1), 415(2), 415(3), ..., 415(j) are repeating waveforms that correspond to a plurality of transmit periods. Each transmit period may have a length corresponding to the sensing period $T_{SENSE}$. In some embodiments, the plurality of null time periods can be evenly distributed within the burst period 410 by operating the transmitter(s) of the sensor module 310 to skip (that is, to not driving) every k-th transmit period of the sensing signals 415(1), 415(2), 415(3), ..., 415(j). Alternately, the transmitter(s) may drive all of the transmit periods, and one or more switching elements decouple the sensing signals 415(1), 415(2), 415(3), ..., 415(j) during periods corresponding to every k-th transmit period. The value k may be any suitable integer value, and is less than or equal to the maximum number of current pulses $n_{max}(1)$, $n_{max}(2)$, $n_{max}(3)$, ..., $n_{max}(j)$ for a particular sensing signal 415(1), 415(2), 415(3), ..., 415(j). Some non-limiting examples include skipping every other transmit period (k=2), skipping every third transmit period (k=3), skipping every fourth transmit period (k=4), and so forth. In some cases, the value k is selected to be evenly divisible into the maximum number of current pulses $n_{max}(1)$, $n_{max}(2)$, $n_{max}(3)$, ..., $n_{max}(j)$.

In some embodiments, the sensor module 310 is configured to determine one or more of the plurality of sensing frequencies 420 based on one or more values of k calculated for a particular (first) sensing frequency $f_{SENSE}(1)$, $f_{SENSE}(2)$, $f_{SENSE}(3)$, $f_{SENSE}(j)$. In some cases, the first sensing frequency may be selected to avoid one or more interference sources. Table 1 includes example values for determining a set of sensing frequencies. For this example, assume a length $T_{BURST}$ of 200 microseconds (μs) and a first sensing frequency $f_{SENSE,1}$ of 100 kilohertz (kHz). The first sensing period $T_{SENSE,1}$ corresponding to the first sensing frequency $f_{SENSE,1}$ is 10 μs. At the first sensing frequency $f_{SENSE,1}$, the maximum number of current pulses $n_{max,1}$ that will fit into the burst period is 20. Although not needed in this example, due to the evenly divisible numbers for $T_{BURST}$ and $T_{SENSE,1}$, in some cases the maximum number of current pulses $n_{max,1}$ may be determined using a floor function to produce an integer value.

One or more potential values for k may be determined based on the maximum number of current pulses $n_{max,1}$. As mentioned above, the k values can be selected to be evenly divisible into the maximum number of current pulses $n_{max,1}$. In Table 1, the potential k values are 2, 4, 5, 10, and 20. For each potential k value, a number of current pulses that will be skipped is determined out of the maximum number of current pulses $n_{max,1}$, as well as a number of current pulses that are received (i.e., not skipped). For example, where k=5 (i.e., every fifth current pulse is skipped), four (4) current pulses out of the maximum number of twenty (20) will be skipped, leaving sixteen (16) current pulses that will be received. Of the different numbers of received current pulses determined for the different values of k, one of the numbers is selected as the number of current pulses $n_{sel}$ corresponding to a selected second sensing frequency $f_{SENSE,2}$.

Using the maximum number of current pulses $n_{max,1}$ and a value for k, a maximum number of current pulses $n_{max,2}$ corresponding to the second sensing frequency $f_{SENSE,2}$ may be determined according to the following relationship:

$$\frac{n_{max,2}}{n_{max,1}} = 1 + \frac{1}{k}. \quad (1)$$

The maximum number of current pulses $n_{max,2}$ may be used to determine a second sensing period $T_{SENSE,2}$ associated with the second sensing frequency $f_{SENSE,2}$ according to the following relationship:

$$T_{SENSE,2} = \left\lfloor \frac{T_{BURST}}{n_{max,2}} \right\rfloor, \quad (2)$$

where the brackets represent a floor function. The second sensing frequency $f_{SENSE,2}$ can be determined as the inverse of the second sensing period $T_{SENSE,2}$. Thus, for the different potential k values of 2, 4, 5, 10, and 20 shown in this example, the potential values for a second sensing frequency $f_{SENSE,2}$ are 150 kHz, 125 kHz, 120 kHz, 110 kHz, and 105 kHz.

In some embodiments, some or all of the determined potential values of the second sensing frequency $f_{SENSE,2}$ may be stored in the plurality of sensing frequencies 420 of the sensor module 310. In one embodiment, the determined potential values of the second sensing frequency $f_{SENSE,2}$ and the first sensing frequency $f_{SENSE,1}$ define the set of the plurality of sensing frequencies 420. For example, the set could be determined as part of an initial calibration process of the sensor module 310. In another embodiment, one or more, but less than all) of the determined potential values are stored using the sensor module 310. For example, the sensor module 310 may use a single value of the second sensing frequency $f_{SENSE,2}$ to dynamically transition from the first sensing frequency $f_{SENSE,1}$, or the sensor module 310 may use a few of potential values of the second sensing frequency $f_{SENSE,2}$ for further evaluation (e.g. perform interference measurements corresponding to the different potential values) before determining which potential value to select as the second sensing frequency $f_{SENSE,2}$.

TABLE 1

Example values used for determining set of sensing frequencies
Assume:
$T_{BURST}$ = 200 μs
$f_{SENSE,1}$ = 100 kHz
$T_{SENSE,1}$ = (1/$f_{SENSE,1}$) = 10 μs
Determine maximum number of current pulses at $f_{SENSE,1}$:
$n_{max,1}$ = floor ($T_{BURST}/T_{SENSE,1}$) = 20

| Potential k value | 2 | 4 | 5 | 10 | 20 |
|---|---|---|---|---|---|
| Pulses skipped in burst period | 10 | 5 | 4 | 2 | 1 |
| Potential $n_{sel}$ value | 10 | 15 | 16 | 18 | 19 |
| $n_{max,2}$ | 30 | 25 | 24 | 22 | 21 |
| $T_{SENSE,2}$ (μs) | 6.667 | 8.000 | 8.333 | 9.091 | 9.524 |
| $f_{SENSE,2}$ (kHz) | 150 | 125 | 120 | 110 | 105 |

As seen above, the potential k value directly impacts the number of current pulses $n_{sel}$ that are received during a burst period. This affects sensing performance, as including a greater number of current pulses $n_{sel}$ per burst period 410 typically corresponds to improved sensing performance. Additionally, the largest sensing frequency difference corresponds to the smallest k value (for k=2, a sensing frequency increase from 100 kHz to 150 kHz), and vice versa. As a result, selection of one of the potential k values represents a trade-off between sensing performance and a desired size of the frequency range. In some embodiments, the sensor module 310 may include one or more parameters that represent predefined limits on the relationship between sensing performance and frequency range. As shown, the sensor module 310 includes a minimum value of k (that is, $k_{min}$), which represents a minimum sensing performance. For example, if $k_{min}$=5, certain potential values for the second sensing frequency $f_{SENSE,2}$ that correspond to k values smaller than 5 (in the example of Table 1, 150 kHz and 125 kHz) could be disregarded (not stored and/or not used). In one embodiment, the $k_{min}$ value is determined according to the following relationship:

$$k_{min} = \left\lfloor \frac{T_{SENSE,2}}{T_{SENSE,1} - T_{SENSE,2}} \right\rfloor, \quad (3)$$

where the brackets represent a floor function. The one or more parameters may be embodied in any other suitable form, such as a maximum value of k, a minimum or maximum number of current pulses per burst period 410, a minimum or maximum sensing frequency, and so forth.

In some embodiments, the processing system 110 further comprises one or more switching elements 445 that are coupled with one or more sensor electrodes corresponding to the sensor electrode groups G(1), G(2), G(3), G(4), . . . , G(m) of sensor electrodes. Although depicted as being outside the sensor module 310, the switching elements 445 may alternately be included as part of the sensor module 310. The processing system 110 generally operates the switching elements 445 in conjunction with the null time period(s). In some cases, the operation of the switching elements 445 by the processing system 110 causes the null time period(s) to be inserted into a burst period 410.

The features described herein may be embodied in suitable alternate forms. In one non-limiting example, after identifying the first sensing frequency $f_{SENSE,1}$ and the second sensing frequency $f_{SENSE,2}$, the processing system 110 may calculate a corresponding value of $k_{min}$ according to Equation (3) instead of having a predefined $k_{min}$ value (e.g., set via user input). In another non-limiting example, the processing system 110 may be operating using a relatively faster second sensing frequency $f_{SENSE,2}$ and uses Equation (1) as part of determining a suitable slower first sensing frequency $f_{SENSE,1}$ for transitioning. Further, and though the discussion above assumes that the burst period length $T_{BURST}$ is maintained constant during a transition between the first sensing frequency $f_{SENSE,1}$ and the second sensing frequency $f_{SENSE,2}$, in another non-limiting example the processing system 110 may use one or more of the variables discussed herein to determine whether a different burst period length $T_{BURST}$ is suitable to transition to.

Figure 5:
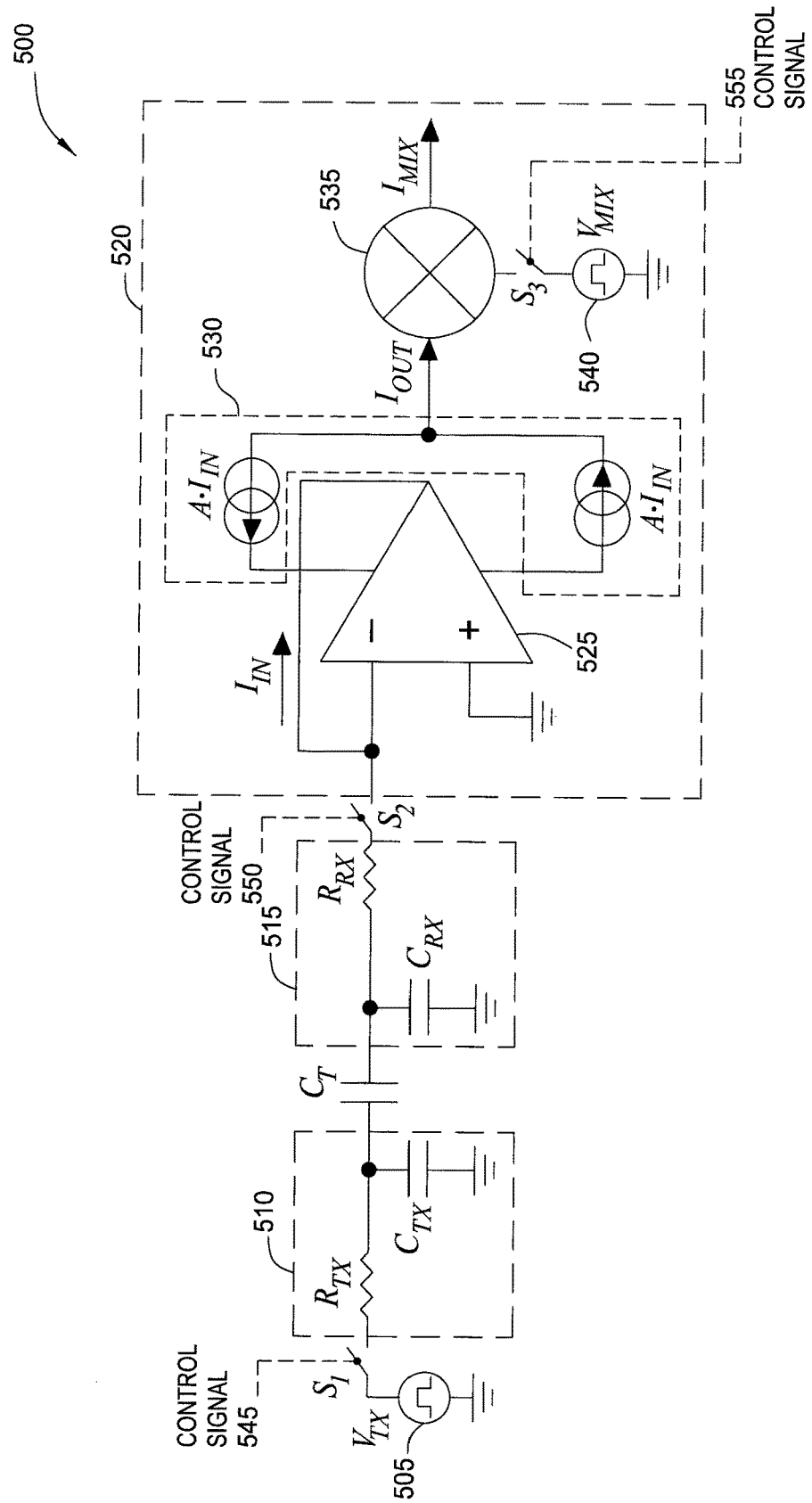
FIG. 5 is a schematic diagram of a sensing arrangement for inserting null time periods within sensing burst periods, according to embodiments described herein.

FIG. 5 is a schematic diagram of a sensing arrangement 500 (or "arrangement") for inserting null time periods within sensing burst periods, according to embodiments described herein. The arrangement 500 is capable of use in conjunction with various embodiments discussed herein, such as the arrangements 200, 300 of sensor electrodes discussed above with respect to FIGS. 2 and 3 and the processing system 110 depicted in FIG. 4.

The arrangement 500 comprises a voltage source 505 that generates a capacitive sensing signal having a voltage waveform $V_{TX}$. The voltage waveform $V_{TX}$ may have any suitable shape, and the frequency of voltage waveform $V_{TX}$ may be controlled based on which predefined sensing frequency (e.g., $f_{SENSE}(1)$, $f_{SENSE}(2)$, $f_{SENSE}(3)$, ..., $f_{SENSE}(j)$ of FIG. 4) is selected. The voltage source 505 drives the capacitive sensing signal onto a sensor electrode 510, which is represented as a first-order model having a transmitter resistance $R_{TX}$ and a transmitter capacitance $C_{TX}$. Based on a transcapacitance $C_T$ between sensor electrode 510 and sensor electrode 515, the sensor electrode 515 receives resulting signals which are provided to receiver circuitry 520. The sensor electrode 515 is also represented as a first-order model having a receiver resistance $R_{RX}$ and a receiver capacitance $C_{RX}$. However, the principles discussed herein also apply to more complex (e.g., distributed) modeling of the plurality of sensor electrodes. Further, although described in terms of a transcapacitive implementation having two separate sensor electrodes 510, 515, the principles discussed herein also apply to absolute capacitive implementations in which the same sensor electrode(s) are used to transmit capacitive sensing signals and to receive resulting signals.

As shown, the receiver circuitry 520 comprises an amplifier 525 (or "op-amp"), a current conveyor (or "current mirror") 530, and a demodulator (or "mixer") 535. The input current $I_{IN}$ represents the resulting signals received by the sensor electrode 515, and is mirrored by the current conveyor 530 (with any suitable gain value A) as an output current $I_{OUT}$. Based on a received demodulation signal (represented as voltage waveform $V_{MIX}$), the demodulator 535 downconverts the output current $I_{OUT}$ having higher (RF) frequencies to a demodulated current $I_{MIX}$, which may be filtered by subsequent circuitry to have approximately direct current (DC) levels (i.e., having substantially no frequency component). As shown, a voltage source 540 generates the demodulation signal with a voltage waveform $V_{MIX}$ that is based on which predefined mixing period (e.g., $T_{MIX,1}$, $T_{MIX,2}$, $T_{MIX,3}$, ..., $T_{MIX,K}$ of FIG. 4) is selected.

The demodulator 535 is generally a continuous-time demodulator having any suitable implementation, such as a square-wave mixer, harmonic rejection mixer, or sinusoidal mixer. In one embodiment, the demodulator comprises a continuous-time delta-sigma demodulator. Generally, use of a continuous-time demodulator 535 allows a relatively simple hardware implementation of the receiver circuitry 520, while avoiding the need for calibrating and storing compensation values for each individual sensor electrode or capacitive pixel. In some embodiments, the demodulator 535 receives a three-level demodulation signal having a positive level, a negative level, and a zero level.

Arrangement 500 further comprises one or more switching elements (e.g., the one or more switching elements 445 described above). In arrangement 500, a first switching element S1 is configured to selectively couple the voltage source 505 and the sensor electrode 510, and a second switching element S2 is configured to selectively couple the sensor electrode 515 with the receiver circuitry 520, and a third switching element S3 is configured to selectively coupled the voltage source 540 and the demodulator 535. The first switching element S1 is controlled by a control signal 545, the second switching element S2 is controlled by a control signal 550, and the third switching element S3 is controlled by a control signal 555. Alternate embodiments having different arrangements of the one or more switching elements are also possible. In one example, a single one of the first switching element S1, the second switching element S2, and the third switching element S3 is included in the arrangement 500. Beneficially, the switching elements S1, S2, and/or S3 may be implemented within the digital domain without requiring relatively larger analog hardware components. Further, while single sensor electrodes 510, 515 are shown as coupled with switching elements S1 and S2, alternate implementations may have multiple sensor electrodes (e.g., a plurality of sensor electrodes within a predefined sensor electrode group) coupled with a single switching element.

As discussed above, each sensing period that occurs within a burst period can correspond to a current pulse generated by the demodulator 535 (e.g., included in the demodulated current $I_{MIX}$). Further, the properties of the null time periods may be selected such that a number of current pulses that occur within each burst period 410 will be the same no matter which sensing frequency $f_{SENSE}(1)$, $f_{SENSE}(2)$, $f_{SENSE}(3)$, ..., $f_{SENSE}(j)$ is selected.

In some embodiments, to prevent selected current pulses from inclusion in the demodulated current $I_{MIX}$ during null time periods, the processing system 110 generates control signals 545, 550, and/or 555 such that at least one of the switching elements S1, S2, S3 is in a non-conducting state during the null time periods. For example, when the switching elements S1 and/or S2 are non-conducting, the input current $I_{IN}$ and output current $I_{OUT}$ will be substantially zero, such that even if the voltage waveform $V_{MIX}$ has a non-zero value, the value of the demodulated current $I_{MIX}$ will also be substantially zero. Additionally, when the switching element S3 is non-conducting, the input of the demodulator 535 associated with the voltage waveform $V_{MIX}$ will have a substantially zero value, and the value of the demodulated current $I_{MIX}$ will also be substantially zero. Outside of the null time periods, the control signals 545, 550, and/or 555 cause the switching elements S1, S2, S3 to be in a conducting state.

In some embodiments, one or more of a transmitter (e.g., voltage sources 505 and/or 540) of the arrangement 500, and the demodulator 535 are disabled during the null time periods. Disabling the transmitter(s) and/or demodulator 535 may be performed as an alternative to operating the switching elements S1, S2, and/or S3 in a non-conducting state, or may be performed in conjunction with the operation. Disabling the transmitter(s) and/or demodulator 535 can be beneficial to reduce a power consumption of the arrangement 500. Further, disabling the demodulator 535 may be beneficial to improve the interference susceptibility of the receiver circuitry 520.

Figure 6:
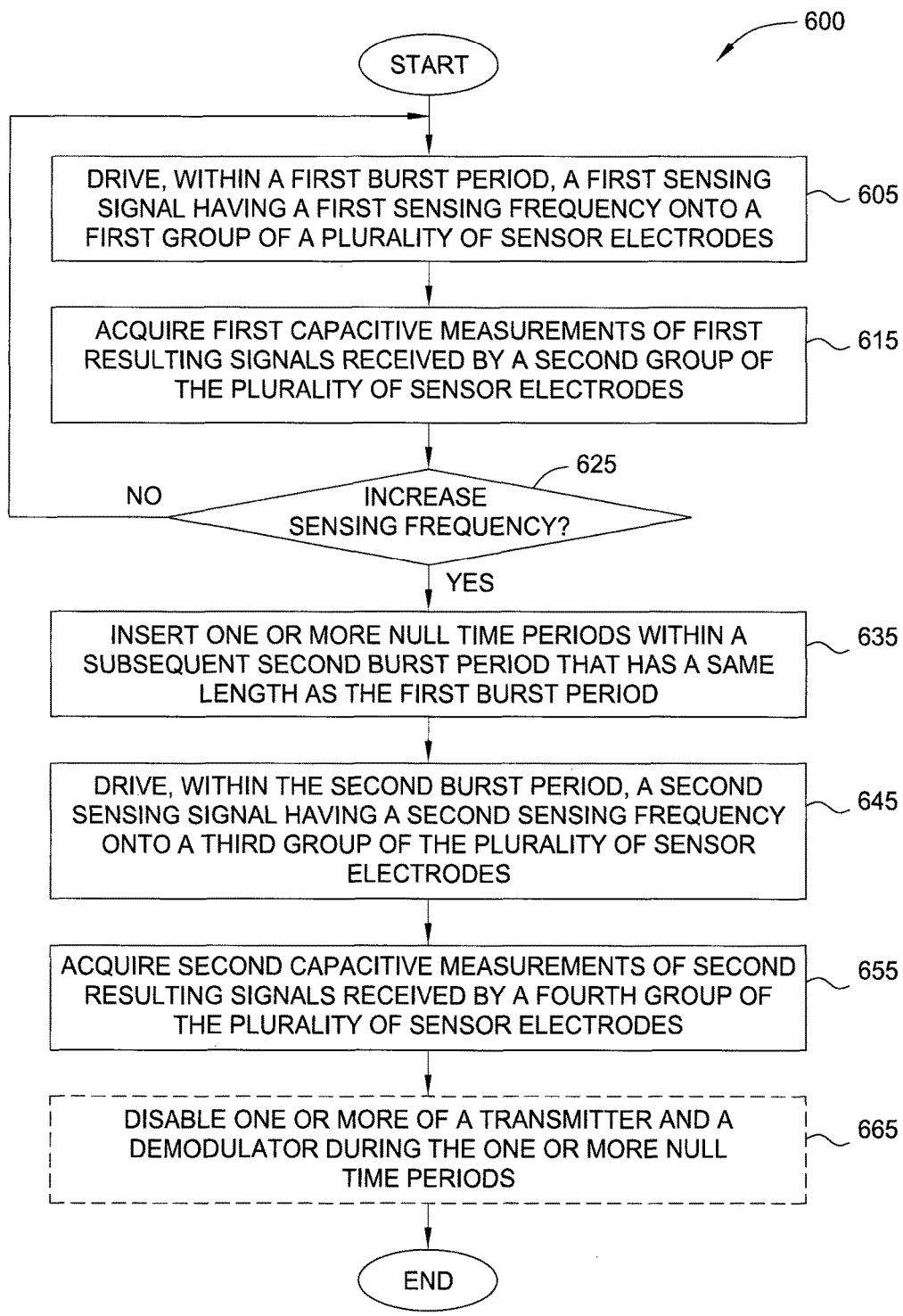
FIG. 6 illustrates a method for changing sensing frequency for sensing signals, according to embodiments described herein.

FIG. 6 illustrates a method 600 of changing sensing frequency for sensing signals, according to embodiments described herein. The method 600 is capable of use in conjunction with various embodiments discussed herein, such as the processing system depicted in FIG. 4, or any other suitable processing system.

Method 600 begins at block 605, where the processing system drives, within a first burst period, a first sensing signal onto a first group of a plurality of sensor electrodes. The first sensing signal has a first sensing frequency.

At block 615, the processing system acquires first capacitive measurements of first resulting signals received by a second group of the plurality of sensor electrodes. Each of the first group and the second group comprises one or more sensor electrodes. In some absolute capacitive sensing implementations, the first group and the second group are the same. In some transcapacitive sensing implementations, the first group and the second group are different. In some embodiments, acquiring first capacitive measurements comprises receiving a predefined number of current pulses (e.g., at an output of a demodulator) during the first burst period.

At block 625, the processing system determines whether to increase a sensing frequency. If not ("NO"), the method returns to block 605 and may drive the first sensing signal (or a different sensing signal having the first sensing frequency) onto the same first group or a different group of the plurality of sensor electrodes. If the processing system determines that the sensing frequency should be increased ("YES"), the method proceeds to block 635, where the processing system inserts one or more null time periods within a subsequent second burst period. The second burst period has a same length as the first burst period. The properties of the one or more null time periods are based at least in part on a second sensing frequency determined by the processing system. The one or more null time periods are selected to cause the same number of current pulses to be received during the second burst period, despite the different second sensing frequency.

At block 645, the processing system drives, within the second burst period, the second sensing signal onto a third group of the plurality of sensor electrodes. The second sensing signal has a second sensing frequency that is greater than the first sensing frequency. The third group may be the same as the first group, but this is not a requirement. In some cases, the transition between the first sensing frequency and the second sensing frequency is performed responsive to detected interference at the first sensing frequency.

At block 655, the processing system acquires second capacitive measurements of second resulting signals received by a fourth group of the plurality of sensor electrodes. The fourth group may be the same as the second group, but this is not a requirement. In some embodiments, acquiring second capacitive measurements comprises receiving the same number of current pulses during the second burst period.

At optional block 665, the processing system disables one or more of a transmitter and a demodulator during the one or more null time periods. Disabling the transmitter and/or demodulator can be beneficial to reduce a power consumption and/or improve the interference susceptibility of the processing system.

Further, although block 635 through optional block 665 are illustrated as occurring in a particular sequence, the person of ordinary skill will understand that the individual blocks may be performed with a different ordering and/or may be partly or fully overlapping in time. Method 600 ends following completion of block 635.

Figure 7:
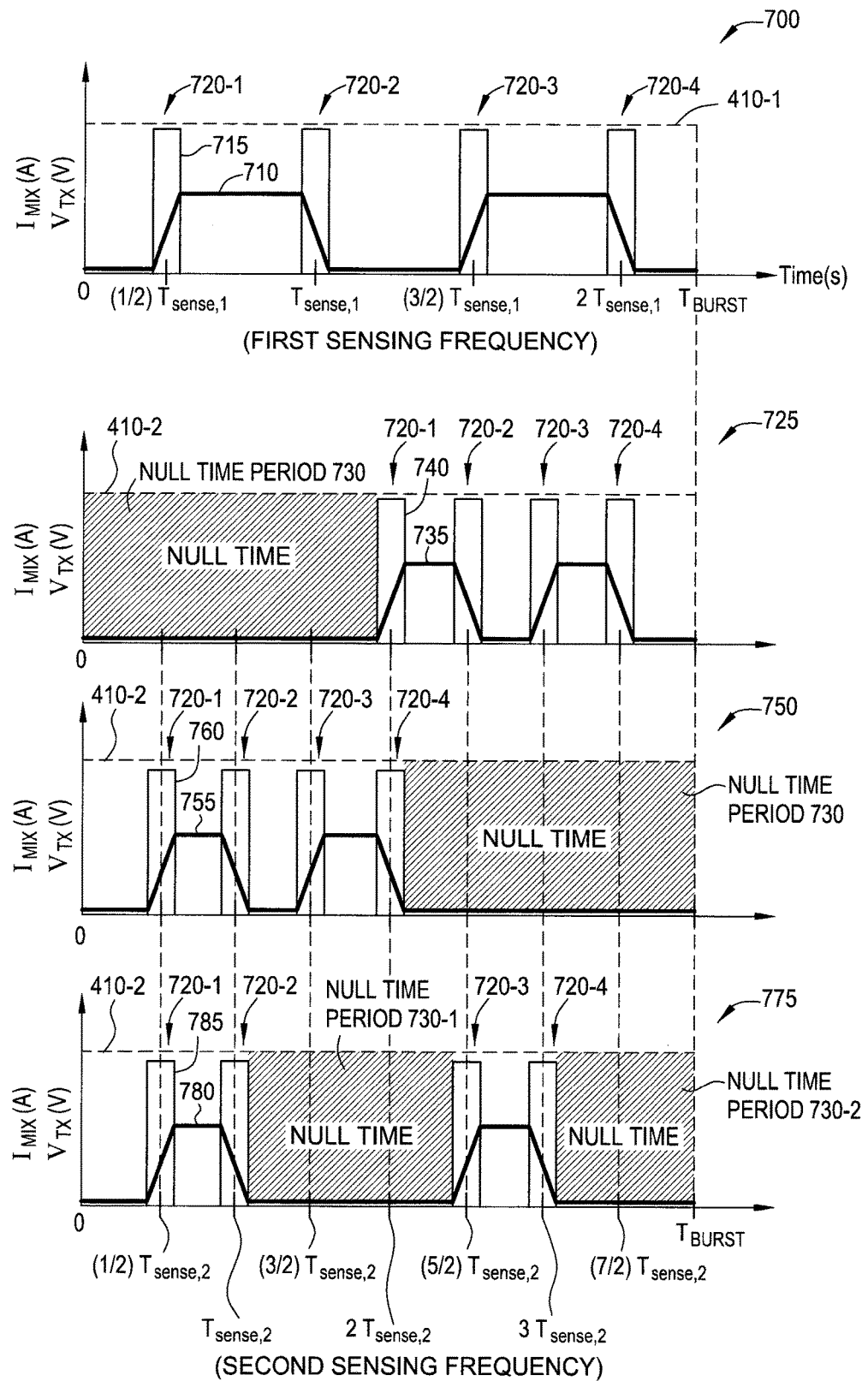
FIG. 7 is a graph illustrating exemplary operation of a sensing arrangement using null time periods within sensing burst periods, according to embodiments described herein.

FIG. 7 is a diagram illustrating exemplary operation of a sensing arrangement using null time periods within sensing burst periods, according to embodiments described herein. Generally, the diagram represents operation of the sensing arrangement 500 depicted in FIG. 5, but may be used with any suitable processing system.

Graph 700 depicts a voltage waveform 710 ($V_{TX}$) in volts (V) and a demodulated current 715 ($I_{MIX}$; an output current of a demodulator) over time in seconds (s). The voltage waveform 710 represents a first sensing signal driven onto a sensor electrode during a first burst period 410-1 having a length $T_{BURST}$. As shown, the voltage waveform 710 is substantially a square wave having a first sensing frequency and alternating between two voltage levels. The time resolution of graph 700 is sufficiently large that the transition periods of the voltage waveform 710 are seen. At the first sensing frequency, the demodulated current 715 includes four (4) current pulses 720-1, 720-2, 720-3, 720-4 corresponding to the transition periods of the voltage waveform 710 during the first burst period 410-1. The transition periods occur at about (½) $T_{SENSE,1}$, $T_{SENSE,1}$, (3/2) $T_{SENSE,1}$, and 2 $T_{SENSE,1}$.

Graph 725 depicts a voltage waveform 735 ($V_{TX}$) and a demodulated current 740 ($I_{MIX}$). The voltage waveform 735 represents a second sensing signal driven onto a sensor electrode during a second burst period 410-2 having the length $T_{BURST}$. The second sensing signal has a second sensing frequency that is greater than the first sensing frequency. In graph 725, a null time period 730 is located at a beginning of the second burst period, and has a timing and a length selected such that the demodulated current 740 includes only four (4) current pulses 720-1, 720-2, 720-3, 720-4. As shown, transition periods of the voltage waveform 735 that would typically occur at (½) $T_{SENSE,2}$, $T_{SENSE,2}$, and (3/2) $T_{SENSE,2}$ do not occur in voltage waveform 735. As discussed further above, this may be achieved by control of the voltage waveform 735 itself (i.e., not driving one or more scheduled transmit periods) or by selectively decoupling the voltage waveform 735 using switching element(s). By controlling the number of current pulses received to be the same as for demodulated current 715, the baseline average current values will be substantially equal for the different sensing frequencies, and less processing is required for acquiring capacitive measurements.

Graph 750 depicts an alternate arrangement having the null time period 730 located at the end of the second burst period 410-2. The timing and the length of the null time period 730 are selected such that the demodulated current 760 includes only four (4) current pulses 720-1, 720-2, 720-3, 720-4. As shown, transition periods of the voltage waveform 755 that would typically occur at (5/2) $T_{SENSE,2}$, 3 $T_{SENSE,2}$, and (7/2) $T_{SENSE,2}$ do not occur in voltage waveform 755.

Graph 775 depicts an arrangement having a plurality of null time periods 730-1, 730-2 that are evenly distributed throughout the second burst period 410-2. The timing and the lengths of the null time periods 730-1, 730-2 are selected such that the demodulated current 785 includes only four (4) current pulses 720-1, 720-2, 720-3, 720-4. As shown, transition periods of the voltage waveform 780 that would typically occur at (½) $T_{SENSE,2}$, $T_{SENSE,2}$, (5/2) $T_{SENSE,2}$, and 3 $T_{SENSE,2}$ do not occur in voltage waveform 780.

Thus, the embodiments and examples set forth herein were presented in order to best explain the embodiments in accordance with the present technology and its particular application and to thereby enable those skilled in the art to make and use the disclosure. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

What is claimed is:

1. A method comprising:
acquiring, responsive to driving a first sensing signal having a first sensing frequency onto a first group of a plurality of sensor electrodes within a first burst period, first capacitive measurements of first resulting signals received by a second group of the plurality of sensor electrodes, wherein acquiring first capacitive measurements comprises receiving a predefined number of current pulses during the first burst period;
driving, responsive to determining to increase a sensing frequency from the first sensing frequency to a second sensing frequency, a second sensing signal having the second sensing frequency onto a third group of the plurality of sensor electrodes within a second burst period having a same length as the first burst period; and acquiring, responsive to driving the second sensing signal, second capacitive measurements of second resulting signals received by a fourth group of the plurality of sensor electrodes, wherein acquiring second capacitive measurements comprises inserting, based at least on the second sensing frequency, one or more null time periods within the second burst period such that the same number of current pulses is received during the second burst period.

2. The method of claim 1, wherein a first baseline capacitive measurement acquired using the first sensing signal corresponds to a first average current value, and wherein a second baseline capacitive measurement acquired using the second sensing signal corresponds to a second average current value that is substantially equal to the first average current value.

3. The method of claim 1, wherein the one or more null time periods are located at a beginning or at an end of the second burst period.

4. The method of claim 1, wherein the one or more null time periods comprise a plurality of null time periods that are evenly distributed throughout the second burst period.

5. The method of claim 4, wherein the second sensing signal comprises a plurality of transmit periods at the second sensing frequency, and wherein inserting one or more null time periods within the second burst period comprises not driving every k-th transmit period of the plurality of transmit periods, where k is a selected integer value.

6. The method of claim 5, further comprising:
determining a minimum value of k according to:

$$k_{min} = \left\lfloor \frac{T_{SENSE,2}}{T_{SENSE,1} - T_{SENSE,2}} \right\rfloor$$

wherein $T_{SENSE,1}$ represents a first sensing period associated with the first sensing frequency, wherein $T_{SENSE,2}$ represents a second sensing period associated with the second sensing frequency, and wherein the brackets represent a floor function.

7. The method of claim 1, further comprising:
disabling one or more of a transmitter and a demodulator during the one or more null time periods.

8. An input device comprising:
a plurality of sensor electrodes; and
a processing system configured to:
acquire, responsive to driving a first sensing signal having a first sensing frequency onto a first group of the plurality of sensor electrodes within a first burst period, first capacitive measurements of first resulting signals received by a second group of the plurality of sensor electrodes, wherein acquiring first capacitive measurements comprises receiving a predefined number of current pulses during the first burst period;
drive, responsive to determining to increase a sensing frequency from the first sensing frequency to a second sensing frequency, a second sensing signal having the second sensing frequency onto a third group of the plurality of sensor electrodes within a second burst period having a same length as the first burst period; and acquire, responsive to driving the second sensing signal, second capacitive measurements of second resulting signals received by a fourth group of the plurality of sensor electrodes, wherein acquiring second capacitive measurements comprises inserting, based at least on the second sensing frequency, one or more null time periods within the second burst period such that the same number of current pulses is received during the second burst period.

9. The input device of claim 8, wherein a first baseline capacitive measurement acquired using the first sensing signal corresponds to a first average current value, and wherein a second baseline capacitive measurement acquired using the second sensing signal corresponds to a second average current value that is substantially equal to the first average current value.

10. The input device of claim 8, wherein the one or more null time periods are located at a beginning or at an end of the second burst period.

11. The input device of claim 8, wherein the one or more null time periods comprise a plurality of null time periods that are evenly distributed throughout the second burst period.

12. The input device of claim 11, wherein the second sensing signal comprises a plurality of transmit periods at the second sensing frequency, and wherein inserting one or more null time periods within the second burst period comprises not driving every k-th transmit period of the plurality of transmit periods, where k is a selected integer value.

13. The input device of claim 12, wherein the processing system is further configured to:
determine a minimum value of k according to:

$$k_{min} = \left\lfloor \frac{T_{SENSE,2}}{T_{SENSE,1} - T_{SENSE,2}} \right\rfloor$$

wherein $T_{SENSE,1}$ represents a first sensing period associated with the first sensing frequency, wherein $T_{SENSE,2}$ represents a second sensing period associated with the second sensing frequency, and wherein the brackets represent a floor function.

14. The input device of claim 8, wherein the processing system is further configured to:
disable one or more of a transmitter and a demodulator during the one or more null time periods.

15. A processing system comprising:
a sensor module comprising circuitry for operating a plurality of sensor electrodes, the sensor module configured to:
acquire, responsive to driving a first sensing signal having a first sensing frequency onto a first group of the plurality of sensor electrodes within a first burst period, first capacitive measurements of first resulting signals received by a second group of the plurality of sensor electrodes, wherein acquiring first capacitive measurements comprises receiving a predefined number of current pulses during the first burst period;
drive, responsive to determining to increase a sensing frequency from the first sensing frequency to a second sensing frequency, a second sensing signal having the second sensing frequency onto a third group of the plurality of sensor electrodes within a second burst period having a same length as the first burst period; and acquire, responsive to driving the second sensing signal, second capacitive measurements of second resulting signals received by a fourth group of the plurality of sensor electrodes, wherein acquiring second capacitive measurements comprises inserting, based at least on the second sensing frequency, one or more null time periods within the second burst period such that the same number of current pulses is received during the second burst period.

16. The processing system of claim 15, wherein a first baseline capacitive measurement acquired using the first sensing signal corresponds to a first average current value, and wherein a second baseline capacitive measurement acquired using the second sensing signal corresponds to a second average current value that is substantially equal to the first average current value.

17. The processing system of claim 15, wherein the one or more null time periods comprise one of: (i) a null time period located at a beginning of the second burst period, (ii) a null time period located at an end of the second burst period, and (iii) a plurality of null time periods that are evenly distributed throughout the second burst period.

18. The processing system of claim 17, wherein the one or more null time periods comprise (iii) a plurality of null time periods that are evenly distributed throughout the second burst period, wherein the second sensing signal comprises a plurality of transmit periods at the second sensing frequency, and wherein inserting one or more null time periods within the second burst period comprises not driving every k-th transmit period of the plurality of transmit periods, where k is a selected integer value.

19. The processing system of claim 18, wherein the sensor module is further configured to:

determine a minimum value of k according to:

$$k_{min} = \left\lfloor \frac{T_{SENSE,2}}{T_{SENSE,1} - T_{SENSE,2}} \right\rfloor$$

wherein $T_{SENSE,1}$ represents a first sensing period associated with the first sensing frequency, wherein $T_{SENSE,2}$ represents a second sensing period associated with the second sensing frequency, and wherein the brackets represent a floor function.

20. The processing system of claim 15, wherein the sensor module is further configured to:

disable one or more of a transmitter and a demodulator during the one or more null time periods.

* * * * *

UNITED STATES PATENT AND TRADEMARK OFFICE
CERTIFICATE OF CORRECTION

PATENT NO. : 10,126,900 B2
APPLICATION NO. : 15/478965
DATED : November 13, 2018
INVENTOR(S) : Eric Scott Bohannon Page 1 of 1

It is certified that error appears in the above-identified patent and that said Letters Patent is hereby corrected as shown below:

In the Specification

Column 16, Line 38, delete "$f_{SENSE}W$," and insert -- $f_{SENSE}(j)$, --, therefor Signed and Sealed this
Twenty-first Day of April, 2020

Andrei Iancu
*Director of the United States Patent and Trademark Office*